US006770834B1

(12) United States Patent
Deshotel

(10) Patent No.: US 6,770,834 B1
(45) Date of Patent: Aug. 3, 2004

(54) WELDING MACHINE

(76) Inventor: Kent Deshotel, 4207 Fitzgerald St., Addis, LA (US) 70710

( * ) Notice: Subject to any disclaimer, the term of this patent is extended or adjusted under 35 U.S.C. 154(b) by 0 days.

(21) Appl. No.: 09/517,258

(22) Filed: Mar. 2, 2000

(51) Int. Cl.[7] .......................... B23K 9/10; B23K 37/00; B23K 31/02; B21D 39/00
(52) U.S. Cl. ............................... 219/78.16; 219/86.22; 219/104; 228/144; 228/5.7; 228/17; 228/265
(58) Field of Search ......................... 219/78.01, 137 R, 219/85.16, 78.16, 81, 82, 83, 84, 86.22, 104; 228/212, 213, 443, 144, 149, 150, 151, 158, 173.2, 265, 5.7, 17, 44.7

(56) References Cited

U.S. PATENT DOCUMENTS

| | | | |
|---|---|---|---|
| 2,666,833 A | | 1/1954 | Mott ............................... 219/8 |
| 3,122,118 A | | 2/1964 | Cooper ........................ 113/99 |
| 3,182,179 A | * | 5/1965 | Anderson ............... 219/137 R |
| 3,197,604 A | | 7/1965 | Tubbyville, Jr. et al. ...... 219/73 |
| 3,497,662 A | | 2/1970 | Rudd et al. ................. 219/106 |
| 3,517,155 A | | 6/1970 | Mantel et al. ................ 219/73 |
| 3,602,687 A | * | 8/1971 | Pollock ................. 219/124.02 |
| 3,609,275 A | * | 9/1971 | Roberts et al. ......... 219/137 R |
| 3,624,341 A | * | 11/1971 | Hazelhurst .................. 219/105 |
| 3,805,014 A | * | 4/1974 | Becker ........................ 219/92 |
| 3,832,523 A | * | 8/1974 | Kitani et al. ............ 219/137 R |
| 3,925,637 A | * | 12/1975 | Becker ....................... 219/102 |
| 3,937,918 A | * | 2/1976 | Robertson .............. 219/124.31 |
| 4,287,405 A | * | 9/1981 | Ohmae et al. ................ 15/319 |
| 4,341,943 A | * | 7/1982 | Nilsen .................... 219/121.63 |
| 4,386,259 A | * | 5/1983 | Nagai et al. ............ 219/137 R |
| 4,392,604 A | * | 7/1983 | Sears ..................... 219/124.34 |
| 4,550,244 A | | 10/1985 | West et al. ................. 219/158 |
| 4,577,088 A | * | 3/1986 | Sharp .................... 219/121.14 |
| 5,493,097 A | | 2/1996 | Gustafsson et al. ......... 219/137 |
| 5,550,347 A | * | 8/1996 | Kasuya et al. .......... 219/137 R |
| 5,726,410 A | * | 3/1998 | Fukushima et al. ...... 219/117.1 |

FOREIGN PATENT DOCUMENTS

WO    WO 88/06505    *   9/1988

OTHER PUBLICATIONS

The Iron Age, Jul. 19, 1945, pp. 69 71; Article by Cyril Provo Hubert.
Trinity Industries, Inc. 1999 Annual Report.
Lincoln Electric Operating Manual , Jan. 1985; NA–4S4 Modified Series ARC Welder "One Side Welding System".

* cited by examiner

Primary Examiner—Stanley S. Silverman
Assistant Examiner—Colleen P. Cooke
(74) Attorney, Agent, or Firm—Roy, Kiesel, Keegan & DeNicola

(57) ABSTRACT

An improved apparatus and method for the prevention of deformation and buckling of metal plates during welding processes is disclosed. The improved apparatus and method are used to apply pressure to a welded seam created between two metal plates during the welding process. Pressure is applied to the area of the plates surrounding the welded seam until the welded seam has sufficiently cooled to prevent deformation and buckling of the metal plates.

60 Claims, 9 Drawing Sheets

WELDING MACHINE

BACKGROUND OF THE INVENTION

1. Field of the Invention

This invention relates to an improved apparatus and method for welding of metal plates and other objects that improves the fit between the objects and which decreases the deformation, movement or buckling of the welded items in the area surrounding the welded seam.

2. Prior Art

Presently, submerged arc welding is used in a variety of industries to weld one or more metal objects together, such as two metal plates. A welding shop may receive lengths of metal plate in rolled form and must unroll the metal plate using heat to flatten the plates as desired. The plates are then cut to desired dimensions using a plasma cutting machine or other suitable device.

When two metal plates are welded together, the adjacent ends of the two metal plates are laid next to each other on a welding bed to form a weld butt between the ends. The welding bed is simply that structure which supports the plates or other objects being welded together. In submerged arc welding it provides a space below the weld butt and usually comprises a series of magnets, also known as chucks, to secure each plate to the welding bed. The welding bed also usually comprises a length of non-ferrous, highly conductive material (referred to as a backing bar), often constructed from copper, that is positioned underneath the weld butt between the two adjacent ends of the two metal plates. A copper backing bar is considered non-consumable because it will not be integrated into the material being welded together because the melting temperature of copper is higher than that of the (usually) steel plates. However, a consumable backing bar, typically made of iron or steel, may be used as well where it is desired to weld the backing material to the other objects being welded together. Finally, when welding methods other than the submerged arc method are used, the backing bar may not be used at all.

Conductive welding flux is placed on top of the backing bar before the plates are in position and poured between the two adjacent ends until it substantially fills the weld butt between them. The flux controls the atmosphere around the weld, preventing oxygen and other foreign material which may weaken the weld from contacting the weld.

A submerged arc-welding machine, having a source of electric current, passes along the weld butt between ends of the metal plates, and the flux allows the electric current to pass between the ends of the plates. The electric current heats the metal to at least its melting point and melts the ends of the plates. The current also melts a filler wire or rod which is positioned over the weld butt. The melted filler and the melted ends of the plates or other objects pool to form a common weld puddle. As the puddle cools and hardens, a welded seam is formed between the plates.

Unfortunately, present methods have disadvantages. The metal plates, and/or then ends thereof, have a tendency to move and buckle along the seam during welding because the heat involved causes the metal to expand. In some instances, the buckling and movement of the metal plates results in broken and uneven weld seams and uneven plate surfaces before the welded seam solidifies—undesirable results in a welding process.

Although magnets are used to secure the metal plates to a welding bed, positioning the magnets too close to the welded seam is undesirable because the magnets affect the weld puddle, or molten metal that cools to form the welded seam. The magnets may "pull" the weld puddle away from the weld butt area where the welded seam is formed, resulting in a weakened welded seam. Thus in the area where the displacement forces from the heat will be the most intense, there is nothing holding the plates in place.

ADVANTAGES AND OBJECTS OF THE INVENTION

The present invention provides an advantage over prior art apparatuses and methods. By using a device that applies pressure to the metal plate or plates adjacent to the welded seam, the present invention decreases the movement and buckling of the metal plates that is normally associated with prior art apparatuses and methods. Because pressure is applied along the weld butt between the plates and along the welded seam until the welded seam sufficiently solidifies, the present device ensures that the welded seam and/or the metal plate area surrounding the welded seam will not deform, buckle, or significantly distort.

With the aforementioned considerations in mind, it is therefore an object of this invention to provide an improved welding apparatus that minimizes movement, deformation, and buckling of metal plates during the welding process.

It is a further object of the present invention to provide an improved welding process that minimizes movement, deformation and buckling of metal plates during the welding process.

It is a further object of the present invention to provide an apparatus that may connect to or cooperate with an existing submerged arc or other welding apparatus to apply pressure to the area surrounding a welded seam until that welded seam sufficiently solidifies.

It is a further object of the present invention to fit plates or other objects together for welding.

These and other advantages and objects of this invention shall become apparent from the ensuing description of the invention.

SUMMARY OF THE INVENTION

This invention comprises a process and an apparatus for applying pressure to metal plate or plates during a welding process. The pressure applicator apparatus may be constructed as part of a welding apparatus or constructed separately and used in conjunction with an existing welding apparatus.

The pressure applicator apparatus may comprise a first pressure applicator configured to contact at least a portion of a first plate adjacent to a weld butt and/or the welded seam between two plates being welded together and a second pressure applicator configured to contact at least a portion of a second plate adjacent to the weld butt and/or the welded seam. The pressure applicators are configured to apply pressure to the plates near the weld butt or the welded seam until the welded seam formed between the plates has sufficiently cooled and hardened to resist significant distortion of the plates.

When constructed as part of a welding apparatus, the invention may comprise (a) a welding bed configured to support one or more metal plates having upper and lower surfaces and ends in an end-to-end relationship with a weld butt between the ends; (b) a source of electric current positioned sufficiently near the bed to allow the current to pass from the current source to the plates, whereby a welded seam may be formed between the plates; the source of electric current or welding bed is configured to move the current source in a path that substantially follows the weld butt between the ends of the plate or plates; and (c) at least one pressure applicator positioned on each side of the weld butt and positioned to contact the plate at a position adjacent to the ends of the plate; the pressure applicators are preferably configured to extend from a point before the source of electric current to a point behind the source of electric current, relative to the direction of movement of the source of electric current or of the movement of the plates, whereby pressure may be applied to the plates for a sufficient period of time to allow the weld seam to solidify sufficiently to resist displacement.

The methods of the present invention can be used when welding flat or curved (concave or convex) metal plates or other metal objects, such as pipe. The method prevents movement, deformation, buckling or substantial distortion of metal plates during a welding process wherein two metal plates are welded together using a source of electric current that forms a welded seam between the metal plates. In general, the improved method comprises the steps of applying pressure to the metal plates along the welded seam to prevent the welded seam from being significantly distorted, moved, deformed or buckled while the welded seam sufficiently solidifies.

In particular, the method may comprise the steps of (a) providing at least two metal plates having upper and lower surfaces and ends; (b) positioning the plates end-to-end on a welding bed; (c) arcing electric current from a source of electric current to plates, thereby melting the ends and creating a welded seam between the plates; (e) applying pressure to the upper surface of the plates with at cast one pressure applicator positioned on each side of the weld butt and/or welded seam between the plates and configured to extend sufficiently behind the source of electric current to allow the pressure applicators to apply sufficient pressure to the plates to prevent the welded seam from being significantly distorted, moved, buckled or deformed while the welded seam solidifies; and (f) moving the plates or the current source so that the current source arcs electric current through and along the weld butt.

DETAILED DESCRIPTION OF PREFERRED EMBODIMENTS OF THE INVENTION

Illustrations of construction, design, and methods of operation of the invention are set forth below with specific references to the Figures. The inventor intends the embodiments described to be illustrative only, and does not intend to limit the scope of his invention to the embodiments disclosed herein.

As used herein, horizontal(ly) shall mean substantially along or parallel to the x-axis shown in the Figures (or along the longitudinal axis of pressure applicators 231, 241). Vertical(ly) shall mean substantially along or parallel to the y-axis shown in the Figures (or along the longitudinal axis of legs 211, 212, 221, 222). Lateral(ly) shall mean substantially along or parallel to the z-axis shown in the Figures (or along the longitudinal axis of front arm 220 or rear arm 210).

Figure 1:
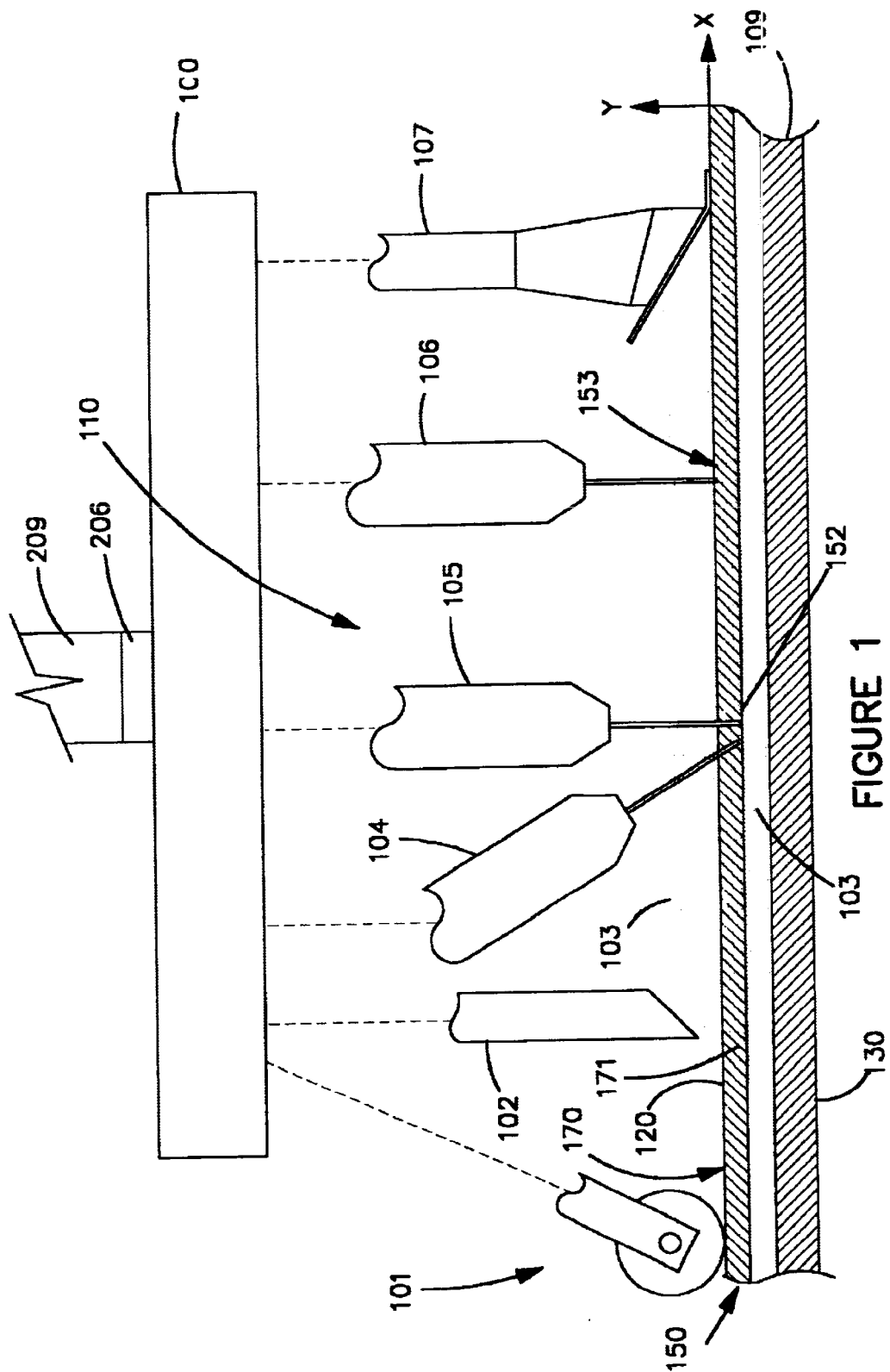
FIG. 1 illustrates a side view of some of the primary components of a conventional submerged arc-welding machine.

FIG. 1 illustrates a side view of a conventional submerged arc-welding machine 100, shown generally as a box. Welding machine 100 can be any suitable type of welding machine used to join metal objects, such as a Lincoln Electric Modified Series Arc Welder Model NA-4S4, available from The Lincoln Electric Company of Cleveland Ohio. The design and operation of a Lincoln Electric Modified Series Arc Welder Model NA-4S4 may be found in the operating manual for Model NA-4S4 which is incorporated herein by reference to the extent it does not conflict with this application.

Welding machine 100 may comprise welding machines other than submerged arc welding machines. Such welding machines/apparatuses may include stick welding (SMAW) devices, inter-shield welding (GMAW, GMAW-P, GMAW-S, GTAW) devices, and heli-arc welding devices and/or other welding processes. The embodiments of the present invention are described as used and constructed for use with a submerged arc welding machine, but it should be noted that apparatus 200 may be suitably modified within the scope of the claims to work with other types of welding apparatuses that may or may not use conductive flux 103.

Welding machine 100 may be vertically positionable using moveable vertical leg 209, and welding machine 100 may also include a lateral positioning assembly (not shown). Welding machine 100 comprises at least one source of electric current 110 that is moveable along a weld butt 150 formed between the ends 161, 171 of metal plates 160, 170. Flux 103 is poured over a highly conductive, nonferrous backing bar, 109, and then ends 161, 171 are spaced slightly apart on welding bed 180 in an end 161 to end 171 relationship. A filler metal (not shown) in cable or wire form may be positioned in weld butt 150 when weld butt 150 comprises a space between ends 161, 171. The filler metal fills weld butt 150 and forms part of the weld puddle that results in welded seam 190.

Current source 110 arcs electric current to plates 160, 170 to melt ends 161, 171 and create a welded seam 190 between plates 160, 170. Plates 160, 170 are preferably grounded and/or grounded to welding machine 100, most preferably with ground leads attached to at least one of plates 260, 170.

In the prior art, current source 110 is typically attached to a lifting leg (not shown). There is usually a wheel at the bottom of the lifting leg. The lifting leg is used to raise and lower current source 110 with respect to plates 160, 170, which establishes the arc height, the distance between current source 110 and plates 160, 170. As current source 110 moves along weld butt 150 to form weld seam 190, the wheel at the bottom of the lifting leg rolls along plates 160, 170. The prior art lifting leg differs from the present invention in that it is not used to hold plates 160, 170 against welding bed 180.

Figure 3:
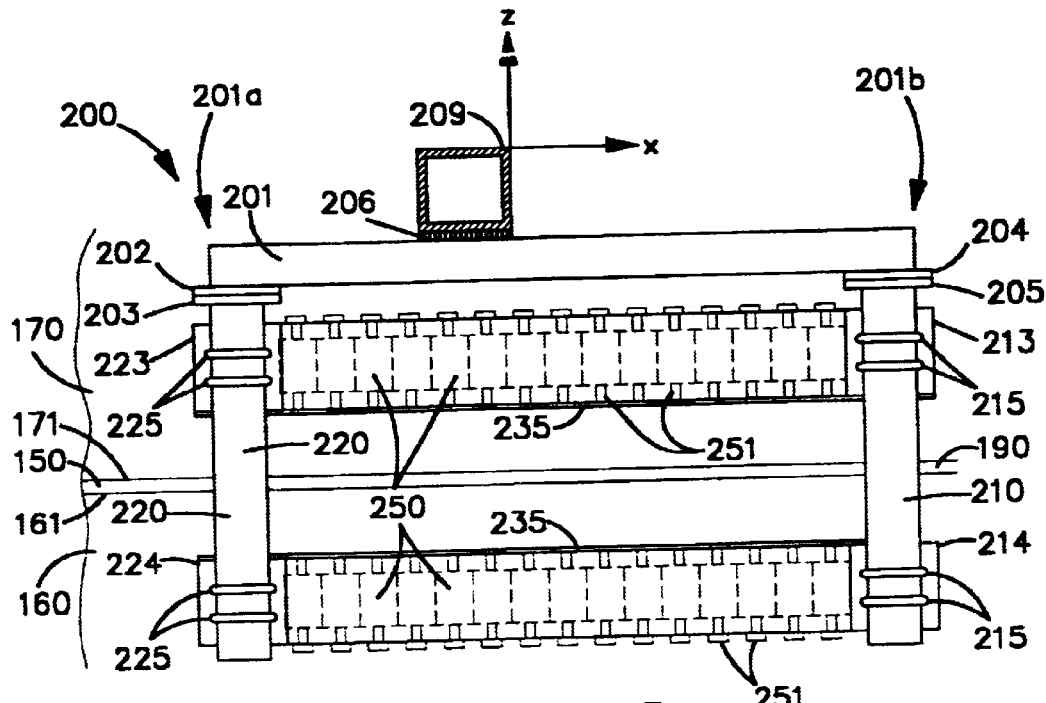
FIG. 3 illustrates a top view of the embodiment of the invention shown in FIG. 2.
Figure 8:
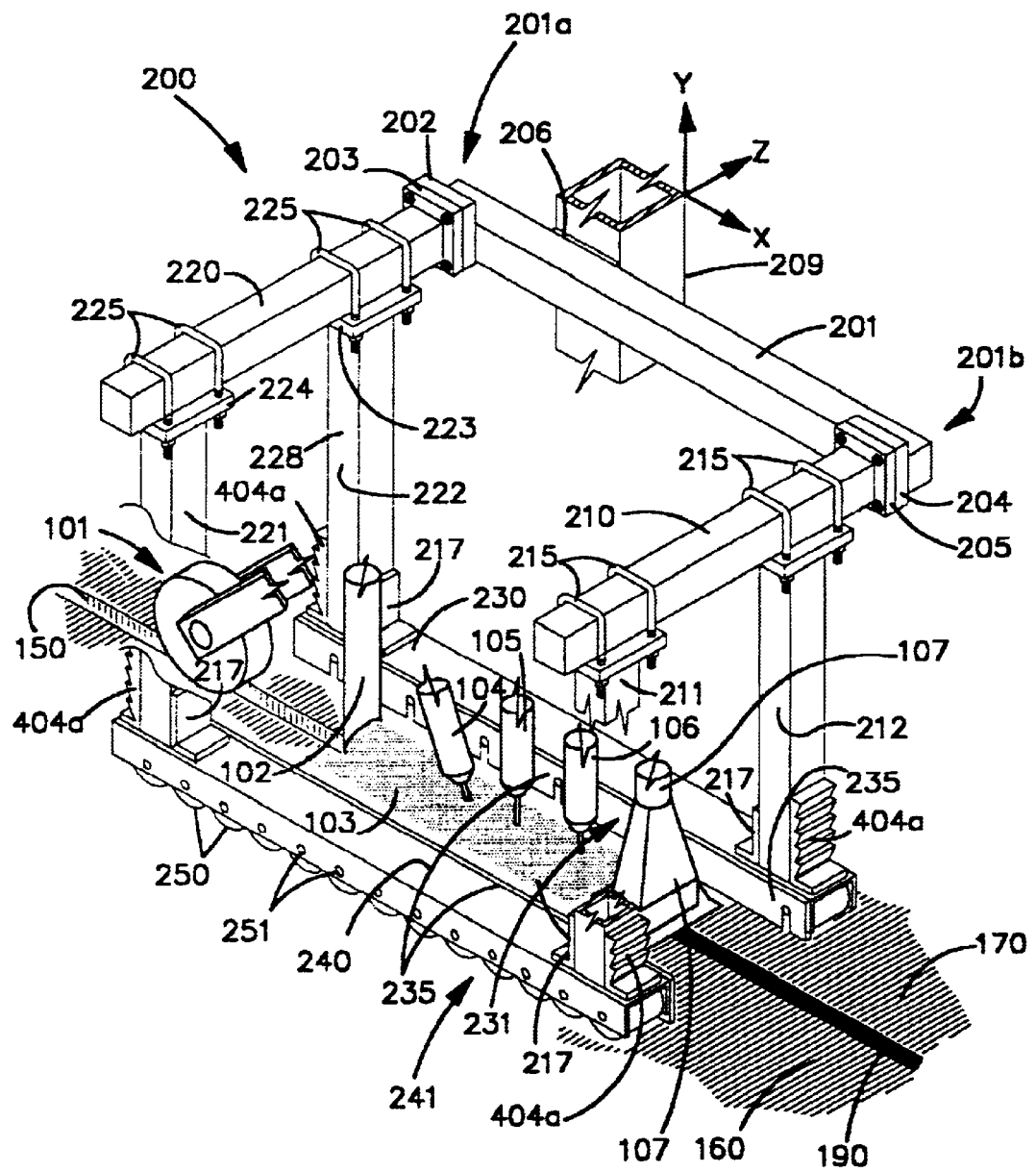
FIG. 8 illustrates the embodiment shown in FIG. 2 with the welding machine components and metal plates incorporated into the Figure.

Weld butt 150 and welded seam 190 are best seen in FIGS. 3 and 8. As used herein, weld butt 150 shall mean the space between ends 161, 171 when plates 160, 170 are supported on weld bed 180, but in some applications, ends 161, 171 may abut. In such cases, weld butt 150 shall mean that area along ends 161, 171 where ends 160, 170 abut. Welded seam 190 shall mean the seam formed in the place of weld butt 150 after current source 110 has passed.

Referring to FIG. 1, welding machine 100 comprises a guide wheel 101 to guide machine 100 along an intended path that substantially follows weld butt 150. Welding machine 100 also comprises a flux delivery hose 102 to deliver flux 103 from a flux hopper (not shown) to the weld butt 150 between the ends 161, 171 of metal plates 160, 170. Metal plates 160, 170 have an upper surface 120 and a lower surface 130. Flux 103 is poured between ends 161, 171 of plates 160, 170 through weld butt 150 until flux 103 substantially fills weld butt 150. Electrical current source 110 comprises a lead electrode 104 and middle electrode 105 that extend through flux 103 into weld butt 150 to weld the lower portion 152 of plates 160, 170 near lower surface 130 and a trail electrode 106 that welds the upper portion 153 of plates 160, 170 near upper surface 120. In applications in which weld butt 150 comprises abutting ends 161, 171, current source 110 may not extend into the area between ends 161, 171.

In other embodiments, current source 110 may comprise more electrodes or fewer electrodes, depending on the application. Welding machine 100 may also include a vacuum assembly 107 to remove any flux 103 remaining atop upper surface 120 after welded seam 190 has been formed. Removing flux 103 allows upper surface 120 and welded seam 190 to cool at a faster rate, thereby increasing the rate at which welded seam 190 solidifies.

Figure 4:
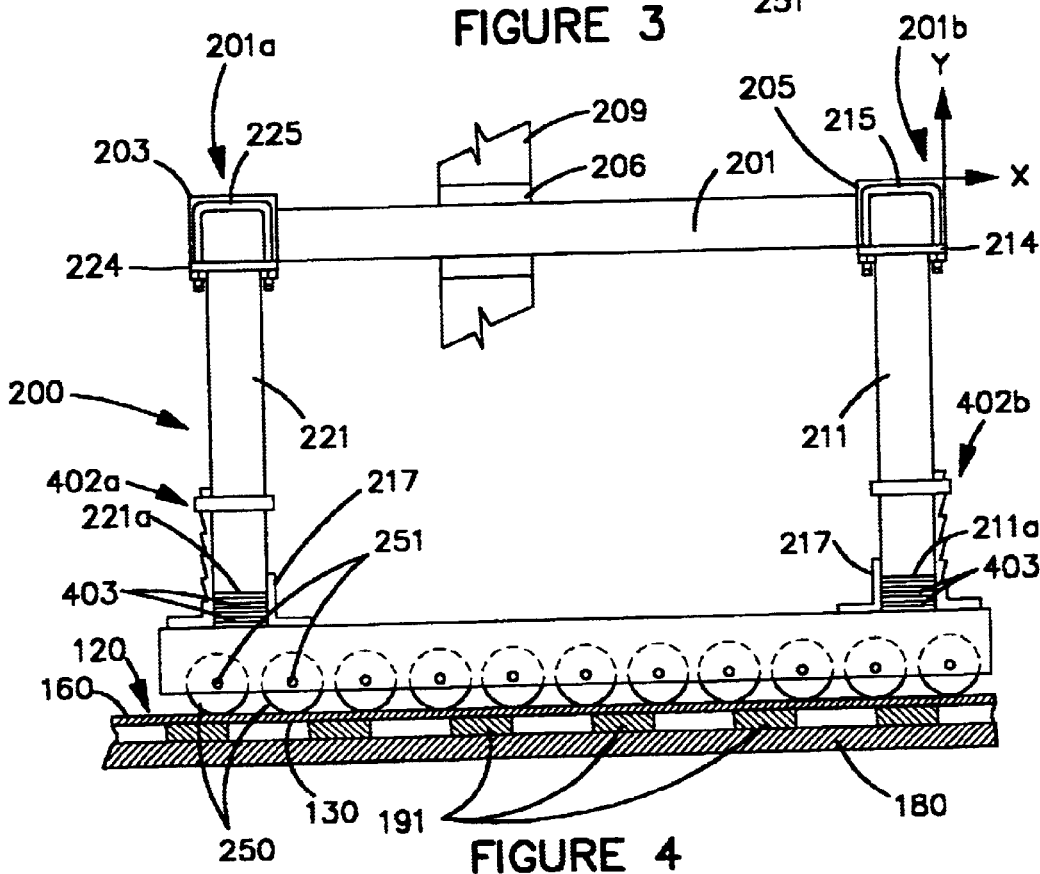
FIG. 4 illustrates a side view of the embodiment shown in FIG. 2 and illustrates the jack assemblies that may be used with the present invention.
Figure 6:
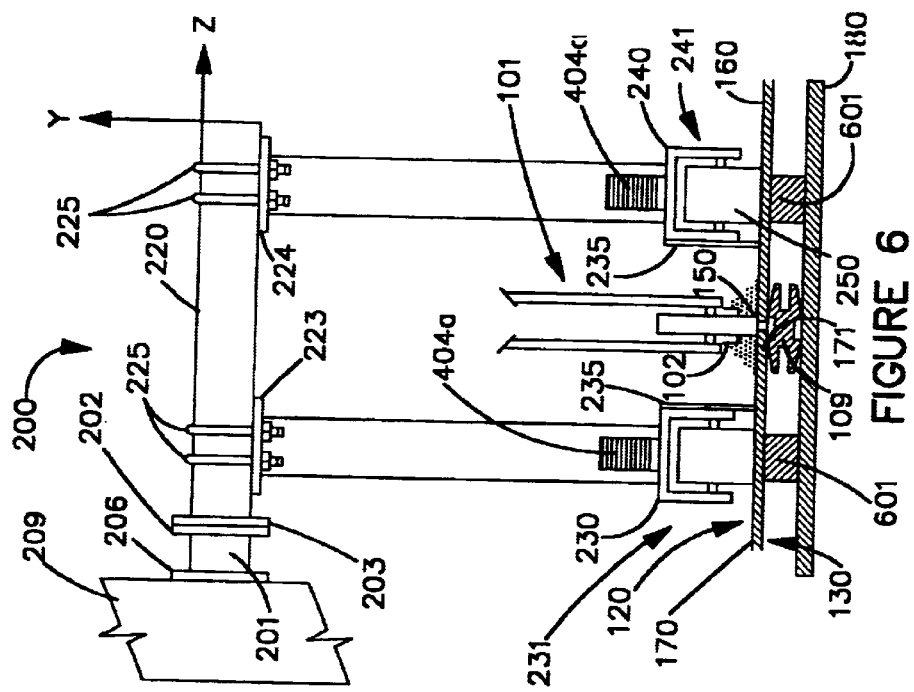
FIG. 6 illustrates a front view of the embodiment shown in FIG. 2.
Figure 5:
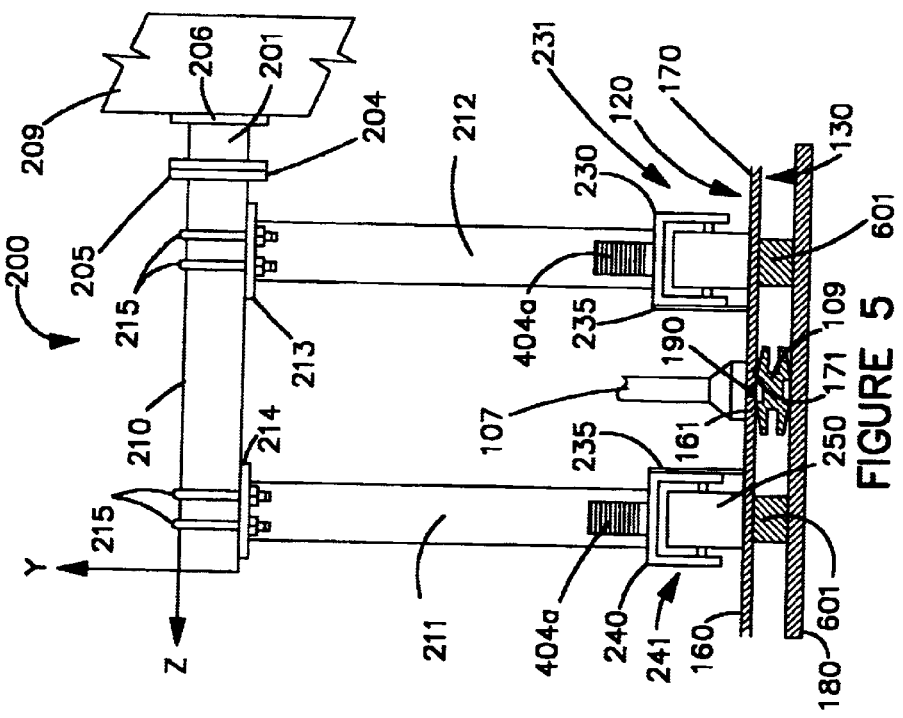
FIG. 5 illustrates a rear view of the embodiment shown in FIG. 2.

As best seen in FIGS. 4–6, metal plates 160, 170 are positioned atop welding bed 180 and secured to bed 180 using one or more magnetic chucks 191. Plates 160, 170 are positioned end 161 to end 171 over a backing bar 109 and opposing welding bed sidewalls 181 so that a weld butt 150 exists between ends 161, 171 to allow current source 110 (electrodes 104, 105, 106) to pass along weld butt 150. Backing bar 109 is vertically positionable so that during the welding process, the upper end of backing bar 109 is positioned very close to or positioned to abut the lower surface 130 of plates 160, 170 thereby packing flux 103 between backing bar 109 and plates 160, 170. Plate ends 161, 171 may be tack-welded to keep sufficient space between them.

Viewing FIG. 8, plates 160, 170 are welded together by moving current source 110 (electrodes 104, 105, 106) along weld butt 150 until ends 161, 171 are welded together, creating a welded seam 190 between plates 160, 170. Alternatively, in an embodiment in which welding machine 100 is fixedly positioned, plates 160, 170 are moved so that current source 110 (electrodes 104, 105, 106) passes along weld butt 150 to weld together ends 161, 171, creating welded seam 190 therebetween.

One of the consequences of welding plates 160, 170 together is that plates 160, 170 may deform, move, buckle or become distorted from heat created by current source 110. To prevent the problems associated with plates 160, 170 moving or buckling, the present invention comprises an apparatus 200 that applies pressure to plates 160, 170 adjacent to weld butt 150 and welded seam 190 to prevent plates 160, 170 from buckling or moving.

Figure 2:
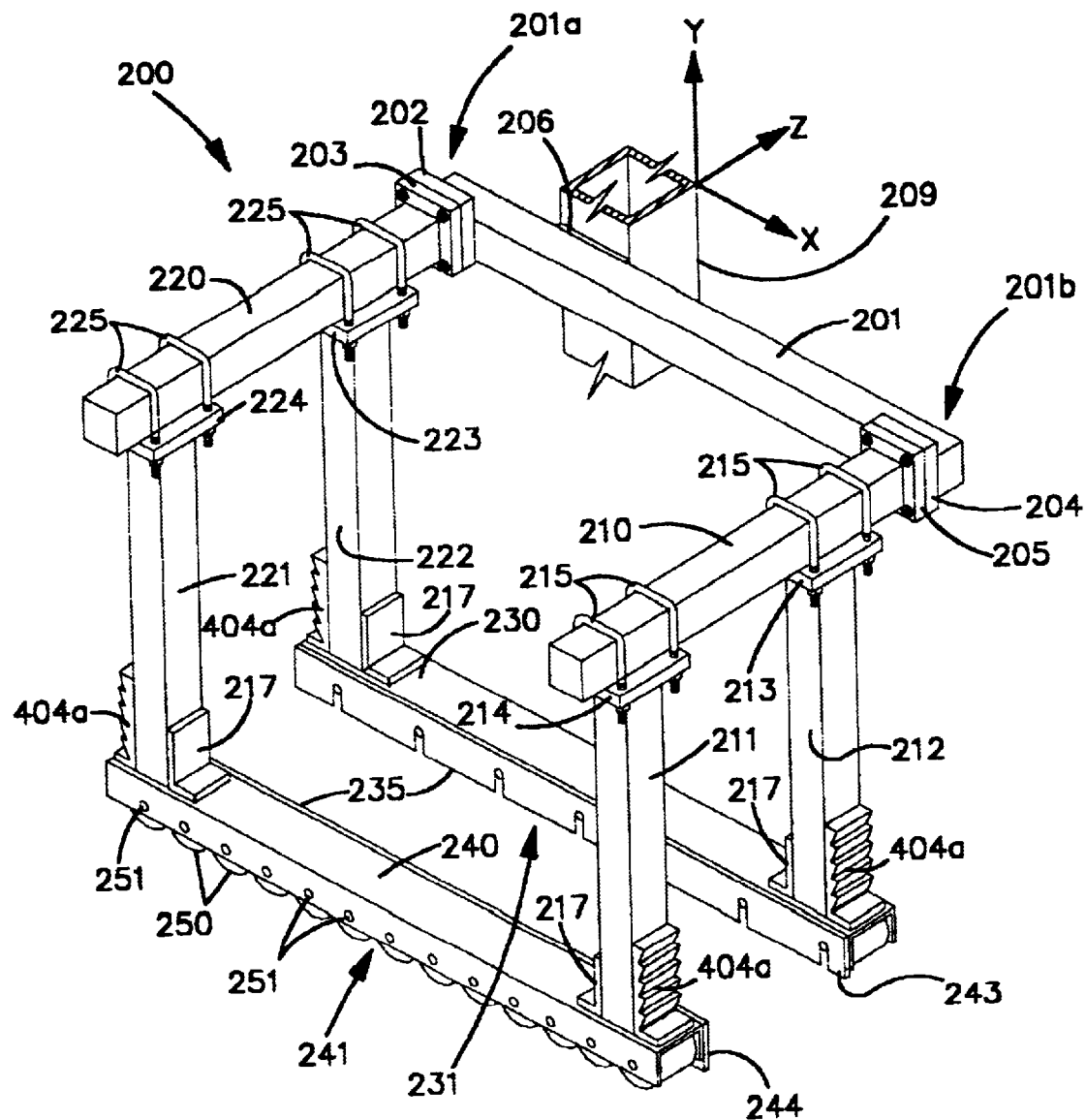
FIG. 2 illustrates a perspective view of an embodiment of the invention shown without the welding components.

In the embodiment shown in FIG. 2, apparatus 200 is configured to attach to vertical leg 209 of welding machine 100. In alternate embodiments, apparatus 200 need not attach to welding machine 100 as long as apparatus 200 cooperates with welding machine 100 to apply sufficient pressure to plates 160, 170 near ends 161, 171 so that plates 160, 170 and ends 161, 171 do not substantially deform, move, buckle, or otherwise become distorted while welded seam 190 sufficiently solidifies. As used herein "sufficiently solidifies" shall mean the solidification of welded seam 190 to the point that welded seam 190 will not substantially deform, move, buckle, or otherwise become substantially distorted when pressure applicators 231, 241 cease to apply pressure.

Referring to FIG. 2, pressure applicators 231, 241 comprise a plurality of rollers 250 positioned within channeled support members 230, 240 on shafts 251 that allow rollers 250 to roll along plates 160, 170. Each roller 250 preferably has a 2-inch outside diameter and is mounted on ¾-inch outside diameter shaft (although other dimensions are acceptable) and is preferably constructed from a hard material having a high melting point such as steel alloys, or some carbon steels. In a preferred embodiment, rollers 250 may be constructed from a strong non-magnetic material such as tantalum or titanium or their alloys. Magnetic or non-magnetic materials may be used for rollers 250; however, non-magnetic materials are preferred so that they will not affect the weld puddle.

Figure 7:
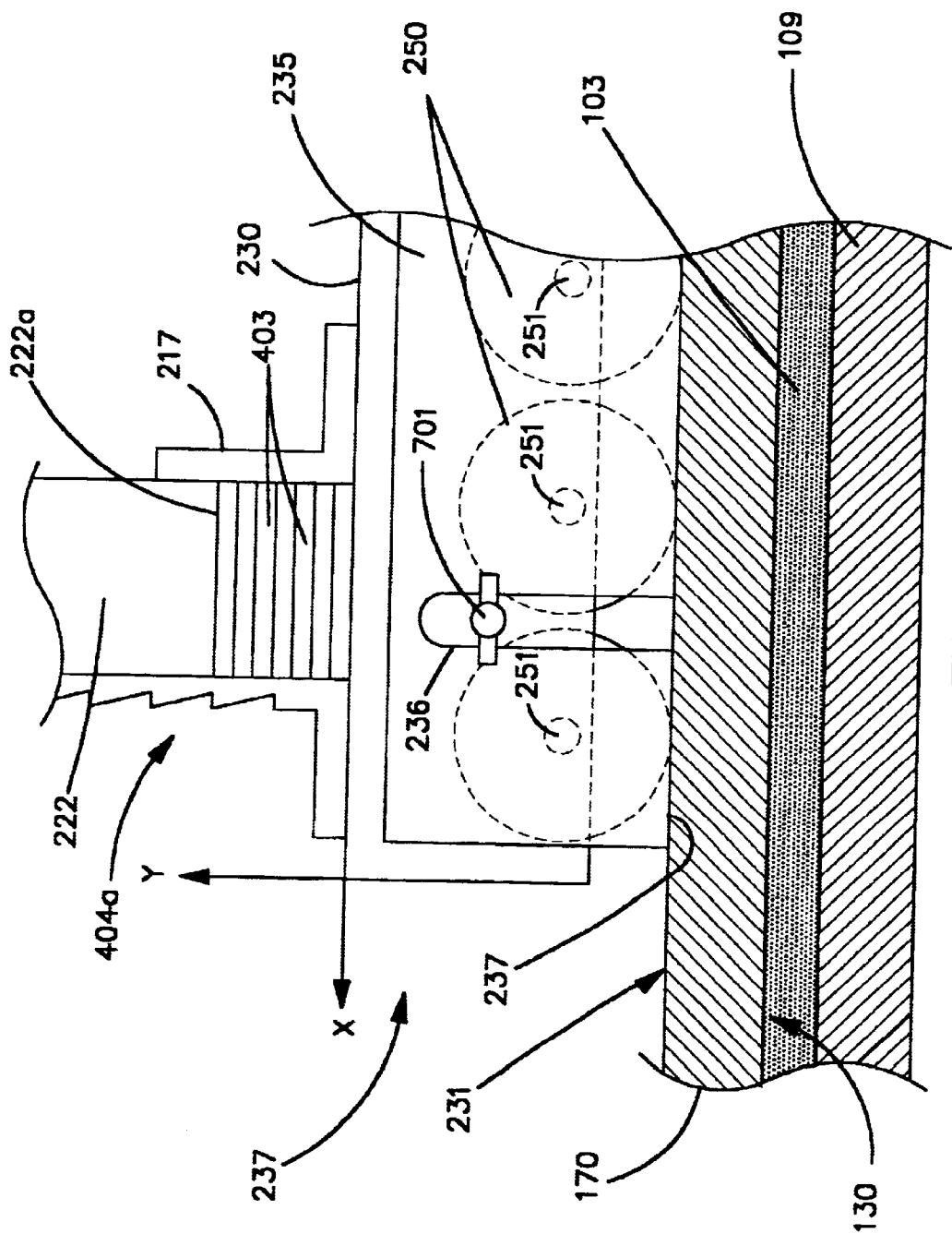
FIG. 7 illustrates the insulation layer and jack assembly that may be used with each leg.

Viewing FIG. 7, rollers 250 are sufficiently spaced along support members 230, 240 to allow rollers 250 to expand as a result of the heat transferred to rollers 250 during the welding process via ends 161, 171, a distance that will vary depending upon the material selected, but which the inventors expects to be about ⅛-inch to 3/16-inch if a 2-inch carbon steel or steel alloy is used.

Viewing FIGS. 5 and 6, apparatus 200 comprises pressure applicators 231, 241 positioned on either side of weld butt 150 (FIG. 6) and welded seam 190 (FIG. 5), preferably as close to weld butt 150 as possible without interfering with the operation of welding machine 100.

After vacuum assembly 107 has vacuumed welded seam 190, a small amount of flux 103, referred to as slag, remains atop welded seam 190 and forms a layer that may be up to ½ inch thick. After the slag has sufficiently cooled and hardened, it can be easily removed with little or no effect on welded seam 190. Because the slag is present, it is not desirable to apply pressure directly to welded seam 190. Applying pressure to welded seam 190 may force the slag downward into the area of the welded seam 190. resulting in a depression formed in welded seam 190 when the slag is removed, causing an uneven or weakened welded seam 190. In embodiments where no slag is formed atop welded seam 190 and there is no danger of a deformed welded seam 190, it may desirable to apply pressure to welded seam 190. In such embodiments, the contact surface of applicators 231, 241 are preferably aligned to be flush with the surfaces of plates 160, 170 facing applicators 231, 241.

Welded seam 190 formed by a submerged arc welding machine is between about ¾ and about 1¼ inches wide, although other types of welding machines may produce thinner or wider welded seams 190. Because it is usually not desirable to apply pressure directly to welded seam 190, the inner edges 233, 243 of applicators 231, 241 are preferably sufficiently spaced so that pressure applicators 231, 241 avoid contact with welded seam 190. Inner edges 233, 243 are preferably positioned at least a inch away from weld butt 150, more preferably about 1½ inches away from weld butt 150. Inner edges 233, 243 are preferably positioned no more than about 2–3 inches from weld butt 150 so that pressure applicators 231, 241 and plates 160, 170 have some support from below from welding bed sidewalls 181.

Pressure applicators 231 apply pressure to plates 160, 170 on both sides of weld butt 150 and welded seam 190 and may take on a variety of forms including, but not limited to rollers 250 (as discussed below) and/or skid plates (not shown) that skid or slide along the surface of plates 160, 170 contacted by pressure applicators 231, 241.

Viewing FIG. 8, pressure applicators 231, 241 arc configured to extend horizontally from at least current source 110 in the direction of vacuum assembly 107 to a point behind current source 110 that is sufficiently removed from current source 110 to allow welded seam 190 to sufficiently solidify. As used herein, the direction "behind current source 110" is used in relation to the direction that either current source 110 or plates 160, 170 are moved during the welding process, and refers to a direction toward that portion of plate or plates 160, 170 that have already been welded. In the preferred embodiment, the inventor contemplates pressure applicators 231, 241 to at least about 18 inches behind current source 110.

In the preferred embodiments of the invention, weld bed 180 will include a pair of sidewalls 601 positioned below and on each side of the weld butt/seam 150/190. Sidewalls 601 will provide a surface for pressure applicators 231, 241 to press against. Pressure applicators 231, 241 should preferably be positioned so that at least part of contact surface 860 (discussed below) of pressure applicator 231, 241 is directly over sidewalls 601.

When pressure applicators 231, 241 are located ahead of electric current source 110, pressure applicators 601 will "fit" the plates or other objects, i.e., push edges 233, 243 into alignment for welding, by pressing edges 233, 243 down into contact with sidewalls 601. When pressure applicators 231, 241 are located behind electric current source 110, they will hold edges 233, 243 against sidewalls 601 until welded seam 190 has sufficiently solidified to resist distortion. Where a backing bar 109 is used, sidewalls 601 should each typically be located about one inch from backing bar 109. However, sidewalls 601 may be used in place of the clips (not shown) that ordinarily hold backing bar 109 in place. In that case, sidewalls 601 should preferably be positioned about ⅛ to 1/16 of an inch from the edges of backing bar 109. The spacing is desired to allow for some heat induced expansion of backing bar 109 during welding. When no backing bar 109 is used, such as in most non-submerged arc processes, sidewalls 601 should be closer together because there is no backing bar 109 there to help support the plates 160, 170 or other objects. In a preferred embodiment, sidewalls 601 will be provided with a removable wear bar 602 which will fit between sidewall 601 and the objects being welded. Thus plates 160, 170 or other objects will rest directly against wear bar 602, and wear bar 602—rather than sidewalls 601—will be worn down by contact with plates 160, 170. When wear bar 602 has been worn down, it may be replaced rather than replacing an entire sidewall 601. Wear bar 602 and sidewalls 601 should each be comprised of a hard high melting point metal such as a steel alloy or even some carbon steels. In an especially preferred embodiment, wear bar 602 and sidewalls 601 will be made of a strong high melting point material that is also non-magnetic such as tantalum or titanium or their alloys.

In a preferred embodiment where apparatus 200 is used in conjunction with a Lincoln Electric Modified Series Arc Welder Model NA-4S4, pressure applicators 231 extend from about the location of guide wheel 101 to at least 18 inches, and more preferably at least 36 inches, behind current source 110. The exact distance pressure applicators 231, 241 will need to extend beyond current source 110 will vary depending upon the type and thickness of the material being welded, the temperature at which that material is welded, the rate at which the material cools, and the rate at which current source 110 or plates 160, 170 are moved. The exact distance is also dependent upon the positioning of vacuum apparatus.107 because heat dissipates more rapidly from welded seam 190 after flux 103 has been vacuumed from upper surface 120. However, the proper location of the rear ends 245 of pressure applicators 231 can be determined for each material by simply experimenting with pressure applicators 231 of different lengths:

Referring back to FIG. 2, apparatus 200 may be constructed as follows. A support plate 206 is welded or otherwise attached to vertical leg 209. First arm 201 is welded or otherwise attached to support plate 206. First arm 201 may have a fixed length or configured to have an adjustable length to vary the distance between the rear end 201b of first arm 201 and front end 201a of first arm 201. Arm 201 may be constructed to be adjustable using a hydraulically operated piston arm or other conventional lifting device. The adjustable length of arm 201 allows pressure applicators 231, 241 having different horizontal dimensions to be interchanged with apparatus 200. A suitable level and/or angle finder (not shown) may be suitably positioned on apparatus 200, preferably on arm 201 or arms 210, 220, so that slight angular adjustments may be made.

Each end 201a, 201b of first arm 201 is configured with suitable support flanges 202, 204 so that first arm 201 can attach to front arm 220 via front arm flange 203 and rear arm 210 via rear arm flange 205. Support flange 202 mates with and attaches to front arm flange 203 using nuts and bolts or other suitable connecting members. Support flange 205 mates with and attaches to rear arm flange 205 using nuts and bolts or other suitable connecting members.

Preferably, the support flanges and arm flanges are connected as shown in the blow-up portion of FIG. 2. A threaded rod 402 is positioned preferably through each corner of each flange 204, 205 and through inner nuts 403a. Outer nuts 402, 404 are threaded onto rod 402 on the exterior sides 405, 406 of flanges 204, 205. All the nuts are then adjusted to securely position flanges 204, 205 relative to each other. The configuration shown in FIG. 2 allows the operator to provide a slight tilt or adjustment of the orientation of pressure applicators 231, 241 by simply adjusting the appropriate nuts. For example, if the operator wishes to slightly tilt pressure applicators 231, 241 toward the direction of vertical arm 209, the operator adjusts the lower nuts 408, 409 on each lower corner so that the lower end 407 of flange 205 moves toward flange 204.

Front legs 221, 222 extend between front arm 220 and pressure applicators 231, 241 and movably attach to front arm 220 via flanges 223, 224 and U-bolts 225. Rear legs 211, 212 extend between rear arm 210 and pressure applicators 231, 241 and movably attach to rear arm 210 via flanges 213, 214 and U-bolts 215. U-bolts 215, 225 allow the lateral distance between the inside edges 243, 244 of pressure applicators 231, 241 to be adjusted. L-shaped gussets 217 may be positioned to engage respective front legs 221, 222 and rear legs 211, 212 to help support them.

The inner edges 243, 244 of support members 230, 240 (or pressure applicators 231, 241) are preferably configured with one or more insulation plates 235 to protect support members 230, 240 from the heat radiating from plates 160, 170. Preferably a plurality of plates 235 is used. An embodiment of insulation plates 235 is more clearly seen in FIGS. 2 and 7. Viewing FIG. 7, insulation plates 235 are attached to inner edges 243, 244 on mounting pins 701. Each insulation plate 235 is configured with a slot 236 that slides around pin 701. The lower edge 237 of insulation plate 235 slides on the upper surface 120 of plate 170. As the contact between plate 170 and the lower edge 237 of insulation plate 235 wears away lower edge 237, slot 236 allows plate 235 to slide downward to compensate for the wear and tear on lower edge 237.

Insulation is also preferably positioned on all surfaces of apparatus 200 that may be affected by heat or may be subject to splatter from molten metal that is associated with some types of welding machines and leads.

In some welding processes, it may be necessary to weld two plates 160, 170 together where each plate 160, 170 has a different thickness. Thus, it may be desirable have the opposing pressure applicators 231, 241 applying pressure along weld butt 150 and welded seam 190 at different vertical positions corresponding to the vertical position of the respective upper surfaces 120 of plates 160, 170. Each leg, or each pair of legs extending to a pressure applicator 231, 241 should preferably be configured to be vertically adjustable so that pressure applicators 231, 241 may be positioned as needed.

One such embodiment of vertically positionable legs is shown in FIGS. 4 and 7. Viewing FIG. 4, jack assemblies 402a, 402b are engaged with each leg 221, 211 and a corresponding pressure applicator. Viewing FIG. 7, jack assembly is number 404, leg is 222, and lower end is 222a. Referring back to FIG. 4, the lower ends 221a, 221a of each leg 211, 221 are configured to fit between gusset 217 and a respective jack assembly 402a, 402b, which are attached to pressure applicator 241. Jack assemblies 402a, 402b raise legs 211, 221 to a distance greater than the desired vertical adjustment and one or more shims 403 are positioned between pressure applicators 241 and lower ends 211a, 221a of legs 211, 221 to support legs 211, 221. Each shim 403 has a specific vertical width that provides a predetermined distance so that when jack assemblies 400a, 402b lower legs 211, 221 onto shims 403, a proper vertical adjustment of pressure applicators 231, 241 is provided. Alternate embodiments, such as hydraulically-operated legs and other conventional assemblies that achieve the same purpose as jack assembly 402 and shims 403 are also acceptable.

Figure 9:
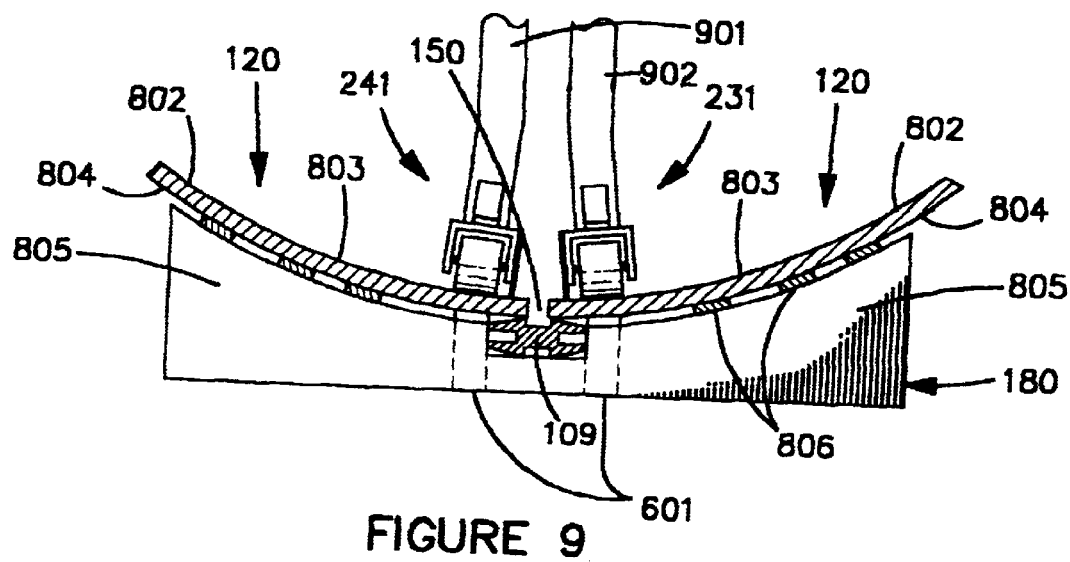
FIG. 9 illustrates an end view of another embodiment of the invention used with arced metal plates.
Figure 10:
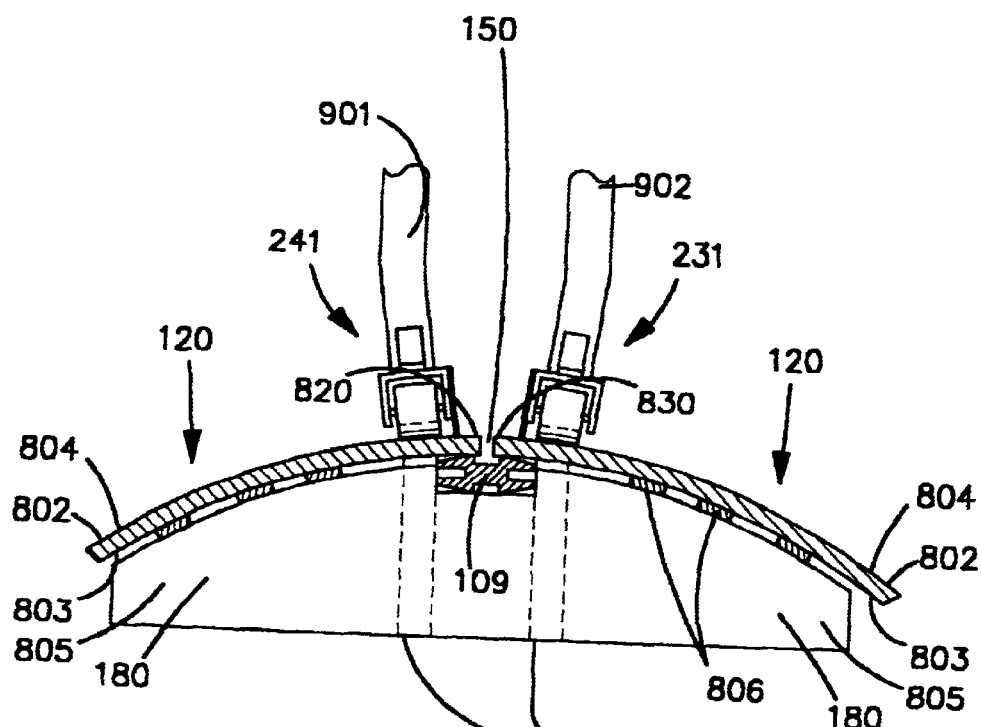
FIG. 10 illustrates an end view of another embodiment of the invention used with arced metal plates.
Figure 11:
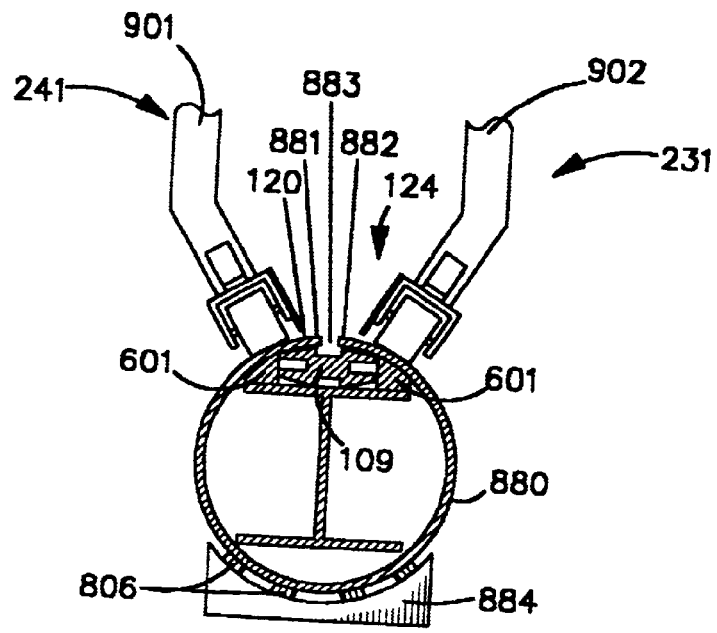
FIG. 11 illustrates an end view of another embodiment of the invention used with a metal plate bent so that the plate ends may be welded together to form a tubular member.
Figure 12:
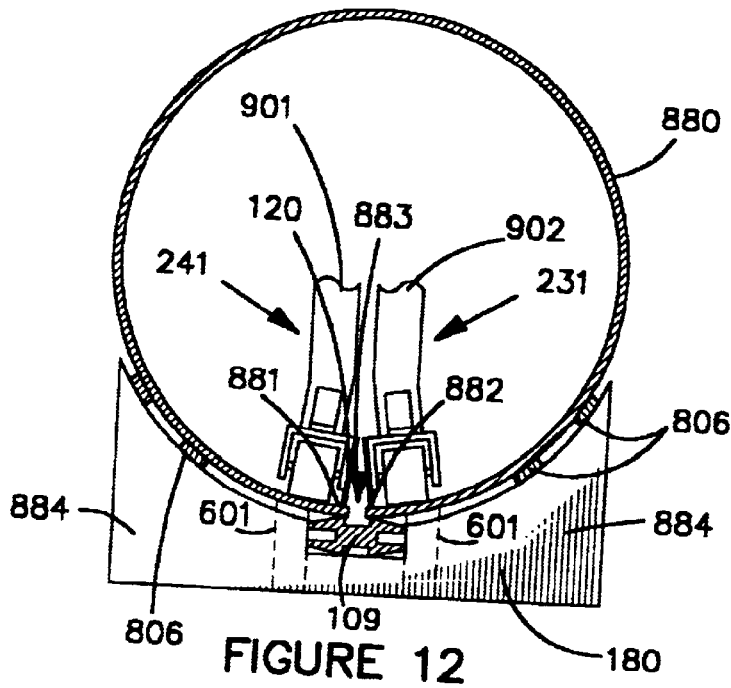
FIG. 12 illustrates an end view of another embodiment of the invention used with a metal plate curved so that the plate ends may be welded together to form a tubular member.

The present invention can also be used to weld not only flat metal plates, but arched metal plates 801, 802 also as shown in FIGS. 9–12. In the embodiments shown in FIGS. 9–12, plates 801, 802 are welded together using the methods of operating welding machine 100 as previously described, whereby either current source 110 (not shown in FIGS. 9–12) or metal plates 801, 802 are moved to allow current source 110 to pass along the weld butt 150 between plates 801, 802 (FIGS. 9 and 10) or weld butt 883 between ends 881, 882 (FIGS. 11 and 12).

FIG. 9 illustrates an embodiment of the invention used to weld arched metal plates 801, 802 each having a concave side 803 and a convex side 804. Each plate 801, 802 is supported by welding bed 180 that comprises one or more wedges 805 having magnetic chucks 806 to support convex side 804. Chucks 806 help position ends 820, 830 of plates 801, 802 over a backing bar 109 in an end 820 to end 830 relationship. In this embodiment, pressure applicators 231, 241 perform the same function and are positioned near weld butt 150 and welded seam (not shown) as previously described.

FIG. 10 illustrates a similar embodiment to that shown in FIG. 9. The chucks 806 on welding bed wedges 805 support convex side 804 while pressure applicators 231, 241 apply pressure to concave side 803. In both FIGS. 9 and 10, plates 801, 802 should be sufficiently supported from below, such as by one or more wedges 805. The embodiment illustrated in FIGS. 9 and 10 may be used to construct large pieces of arched metal plates and tubular members constructed from two or more arched plates 801, 802.

FIGS. 11 and 12 illustrate embodiments of the invention used to construct tubular members from a single piece of rolled metal plate 880. Metal plate 880 is bent or rolled until it has two ends 881, 882 adjacent to each other. A backing bar 109 is positioned below the weld butt 883 formed between ends 881, 882. One or more wedges 884 are used to support plate 880 with weld butt 883 positioned over backing bar 109. Ends 881, 882 are then welded together to create a welded seam (not shown) therebetween in the manner described above, thereby forming a tubular member.

As shown in FIGS. 9–12, the front and rear arms 901, 902 may be angled, but arms 901, 902 may be configured in other ways. Though not shown in the Figures, shims 403 may be constructed from wedges having predetermined angles so that applicators 231, 241 may be tilted or angled to apply pressure to arched surfaces. Alternatively, the front and rear arms may be constructed from a pair of pivoting members to allow an operator to adjust the angle at which pressure will be applied to the metal object or plate. Viewing FIGS. 13 and 14, in each of the embodiments described herein, each applicator 231, 241 is preferably configured to have a contact surface 860 that substantially mirrors upper surface 120 of plates 801, 802, plates 160, 170, or plate 880 that is contacted by each applicator 231, 241 to ensure uniform pressure is applied around weld butt 850, weld butt 150, weld butt 883 or the welded seam formed between plate ends.

Figure 13:
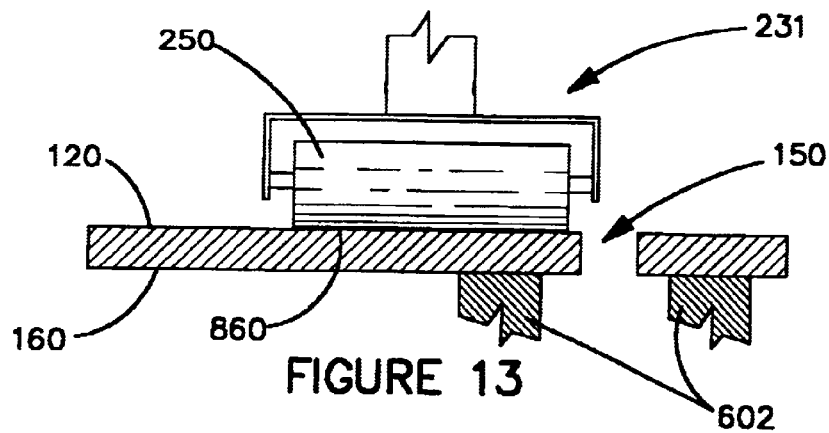
FIG. 13 illustrates the contact surface for a pressure applicator configured to contact a flat metal plate.
Figure 14:
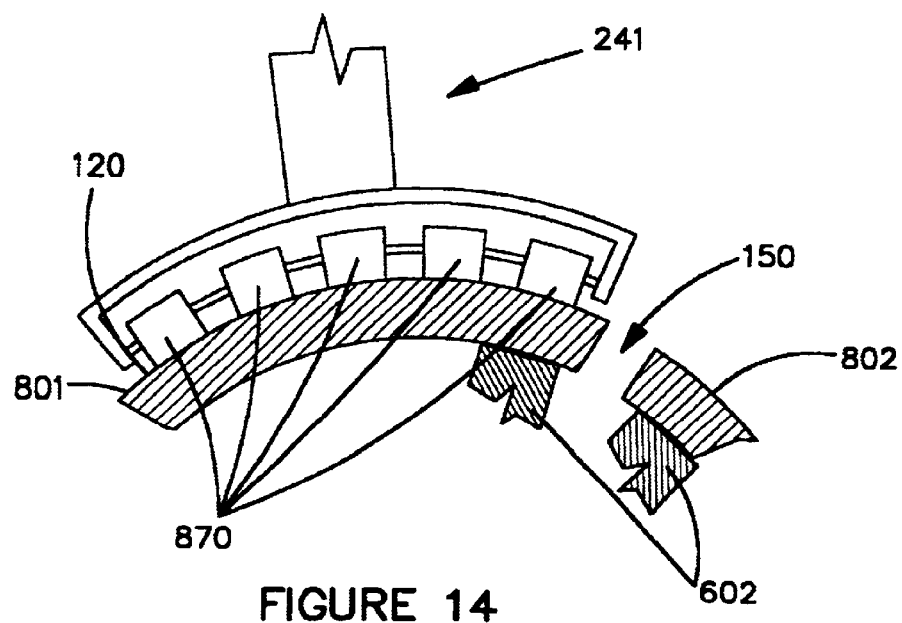
FIG. 14 illustrates an embodiment of a pressure applicator having a contact surface configured to contact a curved metal plate.
Figure 2B:
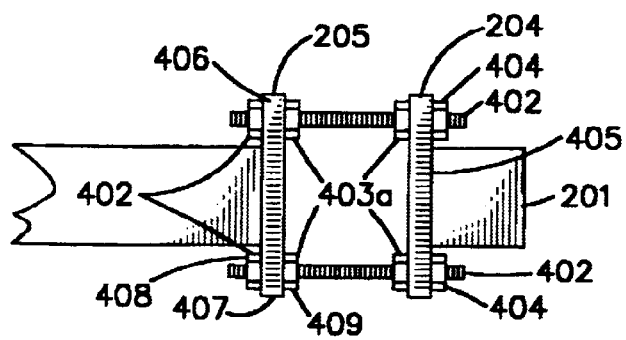
FIG. 2b illustrates a detailed view of the preferred embodiment of a connection between a support flange and an arm flange as shown in FIG. 2.

For example, in the embodiments operating on substantially flat plates 160, 170, contact surface 860i s substantially flat and may comprise a single roller 250, a line of rollers 250 as shown in FIG. 13, or a substantially planar skid plate (not shown). In the embodiments shown in FIGS. 9–12, contact surface 860 would be constructed to be convex or concave, depending on the application. The pressure applicator can be constructed from a suitably configured skid plate, or, as shown in FIG. 14, the pressure applicator can be constructed from a plurality of rollers 870 aligned and configured to substantially mirror the shape of plate surface 120 contacted by pressure applicator 241. In the embodiment shown in FIG. 14, contact surface 860 of pressure applicator 241 is formed by the plurality of rollers 870.

Although welding machine 100 has been described as capable of moving a current source 110 along a weld butt between one or more plates 160, 170 (or other metal objects such as pipe) the present invention also encompasses embodiments wherein welding machine 100 is suitably configured so that current source 110 remains in a fixed position and the metal plates 160, 170 (or other metal objects) are moved past current source 110 so that plates 160, 170 are welded together, creating a welded seam 190 between plates 160, 170. In such an embodiment, pressure applicators 231, 241 may be fixedly positioned relative to current source 110 and extend a sufficient distance from current source 110 so that welded seam 190 has sufficiently solidified before pressure applicators 231, 241 cease applying pressure to plates 160, 170.

In each of the embodiments described herein, applicators 231, 241 and/or other areas of apparatus 200, may be configured with cooling jackets (not shown) to dissipate heat from the components of apparatus 200. The cooling jackets may comprise one or more channels in fluid communication with a source of (circulating) cooling fluid.

Although the preferred embodiment has been described, those skilled in the art to which the present invention pertains will appreciate that modifications, changes, and improvements may be made without departing from the spirit of the invention defined by the claims.

I claim:

1. A welding process comprising the steps of:
   (a) providing at least two metal plates having upper and lower surfaces and ends;
   (b) positioning said plates end-to-end on a welding bed forming a weld butt between said ends;
   (c) arcing electric current from a source of electric current to said plates, thereby melting said ends and creating a welded seam between said plates;
   (d) applying pressure to a surface of said plates with at least one pressure applicator positioned on each side of said weld butt, said pressure applicators configured to extend at least 18 inches behind said source of electric current, said pressure applicators configured to apply sufficient pressure to said plates to prevent said seam from being substantially distorted while said welded seam solidifies; and
   (e) moving said current source along a path substantially following said weld butt between said plates.

2. The process according to claim 1 wherein said pressure applicators comprise one or more rollers.

3. The process according to claim 2 further comprising the step of securing said plates to said bed.

4. The process according to claim 1 wherein at least one of said pressure applicators is horizontally positionable.

5. The process according to claim 1 wherein at least one of said pressure applicators is vertically positionable.

6. The process according to claim 1 further comprising the step of applying pressure to said plates at least 36 inches behind said source of electric current.

7. The process according to claim 1 wherein said pressure applicators comprise at least one contact surface, said contact surface substantially mirroring the shape of the surface of said metal plate that said contact surface contacts.

8. A welding process comprising the steps of:
   (a) providing at least two metal plates having upper and lower surfaces and ends;
   (b) positioning said plates end to end on a welding bed forming a weld butt between said ends;
   (c) arcing electric current from a source of electric current to said plates, thereby melting said ends and creating a welded seam between said plates;
   (d) applying pressure to a surface of said plates with at least one pressure applicator positioned on each side of said weld butt, said pressure applicators configured to extend at least 18 inches behind said source of electric current, said pressure applicators configured to apply sufficient pressure to said plates to prevent said seam from being substantially distorted while said welded seam solidifies; and
   (e) moving said plates so that said current source arcs electric current to said plates along said weld butt.

9. The process according to claim 8 wherein said pressure applicators comprise one or more rollers.

10. The apparatus according to claim 8 wherein at least one of said pressure applicators is horizontally positionable.

11. The process according to claim 8 wherein at least one of said pressure applicators is vertically positionable.

12. The process according to claim 8 wherein said pressure applicators extend at least 36 inches behind said source of electric current.

13. The process according to claim 8 wherein said pressure applicators comprise at least one contact surface, said contact surface substantially mirroring the shape of the surface of said metal plate that said contact surface contacts.

14. A welding apparatus comprising:
   (a) a welding bed configured to support at least two metal plates having upper and lower surfaces and ends in an end-to-end relationship with a weld butt between said ends;
   (b) a source of electric current positioned to allow said current to pass from said current source to said plates, whereby a welded seam may be formed between said plates, said source of electric current configured to move in a path that substantially follows said weld butt between said plates; and,
   (c) at least one pressure applicator positioned on each side of said weld butt and positioned to contact said plate at a position adjacent to the ends of said plate on a surface of each plate, said pressure applicators configured to extend at least 18 inches behind said source of electric current relative to the direction of movement of said source of electric current, whereby pressure may be applied to said plates using said pressure applicators.

15. The apparatus according to claim 14 wherein said pressure applicators comprise one or more rollers.

16. The apparatus according to claim 14 wherein at least one of said pressure applicators is horizontally positionable.

17. The apparatus according to claim 14 wherein at least one of said pressure applicators is vertically positionable.

18. The apparatus according to claim 14 wherein said pressure applicators extend at least 36 inches behind said source of electric current.

19. The apparatus according to claim 14 wherein said pressure applicators comprise at least one contact surface, said contact surface substantially mirroring the shape of the surface of said metal plate that said contact surface contacts.

20. A welding apparatus comprising:
   (a) a welding bed configured to support at least two metal plates having upper and lower surfaces and ends in an end-to-end relationship with a weld butt between said ends, said welding apparatus configured to move said plates in a direction that substantially follows said weld butt between said ends;

(b) a source of electric current positioned sufficiently near said bed to allow said current to pass from said current source to said plates, whereby a welded seam may be formed between said plates; and, (c) at least one pressure applicator positioned on each side of said weld butt and positioned to contact said plate at a position adjacent to the ends of said plate on a surface of each plate, said pressure applicators configured to extend at least 18 inches behind said source of electric current relative to the direction of movement said plates, whereby pressure may be applied to said plates using said pressure applicators.

21. The apparatus according to claim 20 wherein said pressure applicators comprise one or more rollers.

22. The apparatus according to claim 20 wherein at least one of said pressure applicators is horizontally positionable.

23. The apparatus according to claim 20 wherein at least one of said pressure applicators is vertically positionable.

24. The apparatus according to claim 20 wherein said pressure applicators extend at least 36 inches behind said source of electric current.

25. The apparatus according to claim 20 wherein said pressure applicators comprise at least one contact surface, said contact surface substantially mirroring the shape of the surface of a metal plate that said contact surface contacts.

26. A welding process comprising the steps of:

(a) providing at least two metal plates, each said plate having at least a concave surface and ends;

(b) positioning said plates end to end on a welding bed so that at least a portion of said concave surface faces said welding bed and so that a weld butt is formed between said ends;

(c) arcing electric current from a source of electric current to said plates, thereby melting said ends and creating a welded seam between said plates;

(d) applying pressure to a surface of said plates with at least one pressure applicator positioned on each side of said weld butt, said pressure applicators configured to extend at least 18 inches behind said source of electric current, said pressure applicators configured to apply sufficient pressure to said plates while said welded seam sufficiently solidifies; and (e) moving said current source along a path substantially following said weld butt between said ends.

27. The process according to claim 26 wherein said pressure applicators comprise one or more rollers.

28. The process according to claim 26 further comprising the step of securing said plates to said bed.

29. The process according to claim 26 wherein at least one of said pressure applicators is horizontally positionable.

30. The process according to claim 26 wherein at least one of said pressure applicators is vertically positionable.

31. The process according to claim 26 wherein said pressure applicators extend at least 36 inches behind said source of electric current.

32. The process according to claim 26 wherein said pressure applicators comprise at least one contact surface, said contact surface substantially mirroring the shape of the surface of said metal plate that said contact surface contacts.

33. A welding process comprising the steps of:

(a) providing at least two metal plates having upper and lower surfaces and ends, at least one of said surfaces comprising a convex surface;

(b) positioning said plates end to end on a welding bed so that at least a portion of said convex surface faces said welding bed and so that a weld butt is formed between said plates;

(c) arcing electric current from a source of electric current to said plates, thereby melting said ends and creating a welded seam between said plates;

(d) applying pressure lo a surface of said plates with at least one pressure applicator positioned on each side of said weld butt, said pressure applicators configured to extend at least 18 inches behind said source of electric current, said pressure applicators configured to apply sufficient pressure to said plates to prevent said seam from being substantially distorted while said welded seam solidifies; and (e) moving said plates so that said current source arcs electric current to said plates along said weld butt.

34. The process according to claim 33 wherein at least one of said pressure applicators is horizontally positionable.

35. The process according to claim 33 wherein at least one of said pressure applicators is vertically positionable.

36. The process according to claim 33 wherein said pressure applicators extend at least 36 inches behind said source of electric current.

37. The process according to claim 33 wherein said pressure applicators comprise at least one contact surface, said contact surface substantially mirroring the shape of the surface of said metal plate that said contact surface contacts.

38. An apparatus for preventing significant distortion of metal objects during a welding process, wherein said metal objects have ends, said metal objects positioned end to end forming a weld butt between said ends where a welded seam is created during said welding process, said apparatus comprising:

(a) a first pressure applicator configured to contact at least a portion of a first metal object adjacent to said weld butt;

(b) a second pressure applicator configured to contact at least a portion of a second metal object adjacent to said weld butt;

(c) wherein said pressure applicators extend at least 18 inches behind a source of electric current used to weld said objects together and are configured to apply pressure to said objects until said welded scam has sufficiently solidified to resist significant distortion of said metal objects.

39. The apparatus according to claim 38 wherein at least one of said first or second pressure applicators is horizontally positionable.

40. The apparatus according to claim 38 wherein at least one of said first or second pressure applicators is vertically positionable.

41. The apparatus according to claim 38 wherein said pressure applicators extend at least 36 inches behind a source of electric current used to weld said objects together.

42. The apparatus according to claim 38 wherein said pressure applicators comprise at least one contact surface, said contact surface substantially mirroring the shape of the surface of said metal object that said contact surface contacts.

43. The apparatus according to claim 42 wherein said contact surface has a shape selected from the group consisting or planar, convex, and concave.

44. A process for forming a tubular member comprising the steps of:

(a) providing a metal plate having ends and bending said plate until two ends of said plate are positioned adjacent to each other whereby a weld butt is formed between said ends;

(b) positioning said plate on a welding bed;

(c) arcing electric current from a source of electric current to said plate, thereby melting said ends and creating a welded seam between said ends;

(d) moving said current source along a path substantially following said weld butt between said ends;

(e) providing at least one pressure applicator positioned on each side of said weld butt, said pressure applicators configured to extend at least 18 inches behind said source of electric current relative to the direction said source of electric current is moved; and (f) applying pressure to said plate with said pressure applicators along said welded seam, whereby said pressure applicators substantially prevent said welded seam from being significantly distorted as said welded seam solidifies.

45. The process according to claim 44 wherein at least one of said pressure applicators is horizontally positionable.

46. The process according to claim 44 wherein at least one of said pressure applicators is vertically positionable.

47. The process according to claim 44 wherein said pressure applicators extend at least 36 inches behind said source of electric current.

48. The process according to claim 44 wherein said pressure applicators comprise at least one contact surface, said contact surface substantially mirroring the shape of the surface of a metal plate that said contact surface contacts.

49. A process for forming a tubular member comprising the steps of:

(a) providing a metal plate having ends and bending said plate until two ends of said plate are positioned adjacent to and substantially parallel to each other, whereby said ends form a weld butt;

(b) positioning said plate on a welding bed so that said adjacent plate ends are positioned over a backing bar;

(c) arcing electric current from a source of electric current through said weld butt to said plate, thereby melting said ends and creating a welded seam;

(d) moving said plate so that said current source arcs electric current through and along said weld butt;

(e) providing at least two pressure applicators positioned adjacent to and on opposite sides of said weld butt, said pressure applicators configured to extend at least 18 inches behind said source of electric current relative to the direction said plate is moved; and (f) applying pressure to said plate with said pressure applicators along said welded seam, whereby said pressure applicators will substantially prevent movement of said plate along the welded seam as said welded seam solidifies.

50. The process according to claim 49 wherein at least one of said pressure applicators is horizontally positionable.

51. The process according to claim 49 wherein at least one of said pressure applicators is vertically positionable.

52. The process according to claim 49 wherein said pressure applicators extend at least 36 inches behind said source of electric current.

53. The process according to claim 49 wherein said pressure applicators comprise at least one contact surface, said contact surface substantially mirroring the shape of the surface of a metal plate that said contact surface contacts.

54. An improved process for preventing distortion of metal objects during a welding process wherein two metal objects are welded together using a source of electric current that creates a welded seam between said metal objects, said improvement comprising the step of applying pressure with pressure applicators to said metal objects along said welded seam and at least 18 inches behind said source of electric current while said welded seam solidifies.

55. The process according to claim 54 further comprising the step of applying pressure to said plates at least 36 inches behind said source of electric current.

56. The process according to claim 54 wherein a filler metal is provided between said metal objects.

57. A process according to claim 1, 8, 26, 33, 44, 49, or 54 wherein said pressure applicators are configured to apply pressure to said plate or plates before said source of electric current as well as after said source of electric current.

58. An apparatus according to claim 14, 20, or 38 wherein said pressure applicators are configured to apply pressure to said plate or plates before said source of electric current as well as after said source of electric current.

59. A process according to claim 1, 8, 26, 33, 49 or 54 wherein said weld butt is provided with a filler metal to promote the formation of a weld seam.

60. An apparatus according to claim 14, 20, or 38 wherein said weld butt is provided with a filler metal to promote the formation of a weld seam.

\* \* \* \* \*